Oct. 24, 1933. R. S. JONES Re. 18,976

SPRING CONSTRUCTION

Original Filed Jan. 16, 1932

INVENTOR.
ROY S. JONES.

BY
Lockwood Lockwood Goldsmith & Galt
ATTORNEYS.

Reissued Oct. 24, 1933 Re. 18,976

UNITED STATES PATENT OFFICE 18,976

SPRING CONSTRUCTION

Roy S. Jones, Anderson, Ind., assignor to Barber Manufacturing Co., Anderson, Ind., a corporation Original No. 1,915,674, dated June 27, 1933, Serial No. 587,106, January 16, 1932. Application for reissue August 14, 1933. Serial No. 685,133

2 Claims. (Cl. 5—353)

This invention relates to a spring cushion construction suitable for seats of Coxwell chairs, davenports, and also removable cushions for the same.

Whenever bands or straps are employed for anchoring the respective springs in predetermined position, the action of the springs and bands when a load is applied to the same, is to shift relatively or if anchored against shifting to squeak and create a noise that is highly objectionable.

The present invention is intended to eliminate substantially all noise and to insure permanent positioning of all coil springs.

Heretofore cushions have been chiefly rectangular in outline. Whenever an arched or curved outline or side was required, the cushion manufacturer has been compelled to pad the cushion base at certain portions to obtain the enlargement or curvature desired.

The present invention eliminates the requirement of this additional outline forming padding.

The present invention also is intended to provide flexibility, to wit, cushion units of different lengths may be rigidly associated together to form a base construction for a completed cushion and in which the spring portion of the base substantially conforms to the desired outline of the completed cushion.

The full nature of the invention will be understood from the accompanying drawing and the following description and claims:—

In the drawing, Fig. 1 is a top plan view of a cushion base formed from a plurality of cushion units, three ends of which are substantially straight and the other of which is arcuate or curved, a part of the fabric enclosing the springs of the cushion units being removed for illustrating in detail the same and other parts.

Figure 3:
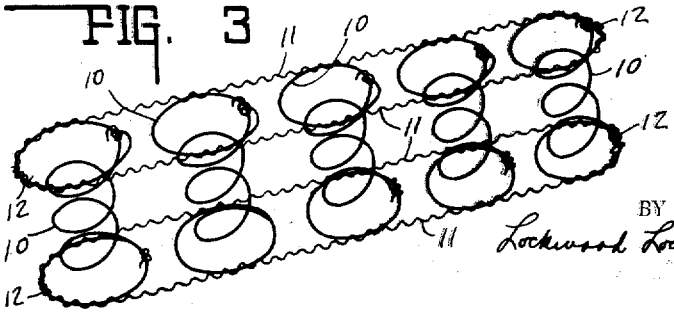
Fig. 3 is a perspective view of the spring unit, the fabric cover being omitted.

In Fig. 3 of the drawing there is illustrated a plurality of so-called double conical coil springs 10. These springs are positioned substantially parallel to each other and either in abutting or spaced relation depending upon the amount of spacing desired between the coils. An open coil twisted wire 11 is wound about each coil 10 at the upper and lower coils and at diametrically opposite points of each of said coils. Each of the four open coil twisted wires 11 extend from one coil to the next adjacent coil, forming a line of coils in tandem relation and the number thereof is that desired or required and the spacing thereof is that desired or required.

The wire 11 is formed with an open coil and is forced longitudinally and rotatively away from the coil forming device and the free end is applied to the coil 10. The wire in its rotative movement is threaded along the spring and after the free end clears the coil, a second coil is presented to the free end at the proper space or distance, and it is similarly secured to the wire. The desired number of coils in the desired spaced relation are similarly anchored, whereupon the open coil twisted wire is severed.

Figure 1:
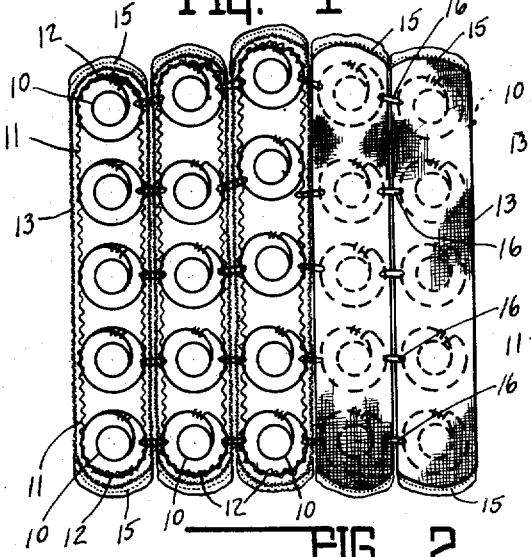

The coil wires are extended and preferably overlap at the ends of the spring unit, as shown in Fig. 3, and in the left hand portion of Fig. 1. In place of four wires of open coil twisted type, only two wires need be employed and in that event, one end coil will be at least half way encircled, and there will only be a single overlap indicated at 12 for each of the wires, while Fig. 3 shows four overlaps for the four wires. By the word "overlap", it is intended to convey the meaning that the open coil twisted wire ends are wound together. The resultant construction is a spring unit in which the coils desired are secured together in substantial tandem alignment and in the desired spaced relation and such spacing need not be uniform or identical. When complete there results a unitary spring structure of coils and coiled wires.

A strip of jute or gunny sack like material used in the upholstery industry is indicated at 13 and includes a longitudinal seam as at 14. This forms an open end tube which is maintained in cushion unit relation when the spring unit is compressed and inserted therein. The fabric cocoon or pocket 13 limits the expansion of the coils and determines the cross sectional depth of the cushion unit. The width of the coil 10 together with the wires 11 determines the width of the cushion unit. The units may be made in any length, width and depth. The ends of the cocoons or pockets are then closed by sewing, as at 15.

Figure 5:
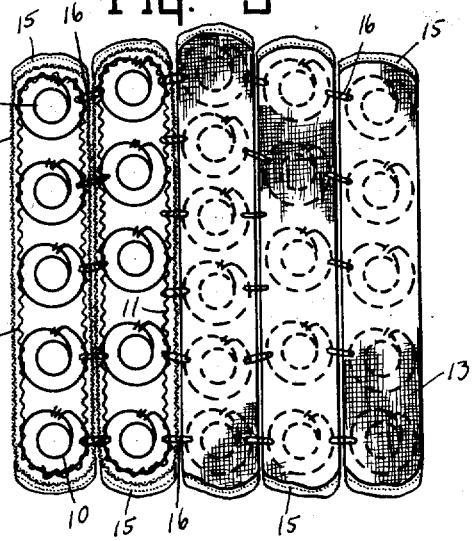
Fig. 5 is a view similar to Fig. 1 and of a modified form of the invention.

When a square cushion is to be made, the desired number of units of identical length are positioned side by side, as indicated in Fig. 1, and suitably secured together. When a cushion base having a curved outline at one end is desired, a suitable number of cushion units are placed side by side, said units being of different lengths, as shown in Figs. 1 and 5. In Fig. 1 the difference in length in each unit is obtained by additional spacing between the coils 10 in each spring unit, while in Fig. 5, the additional length is obtained, in one instance, by additional spacing between the coils in the spring unit and in another instance is shown by additional coils in the spring unit.

The cushion units are secured together by a clip arrangement which consists of an open C-wire 16, adapted to be mounted in a tool such as a pair of pliers or a hog ringer, and the two open ends 17 of the C are passed through the fabric and around the adjacent wires 11 and around—see Fig. 1—the portion of the coil 10 encircled by the wire 11. The ends 17 then are drawn inwardly in meeting or overlapping engagement, as indicated at 18 in Fig. 2. This type of anchorage thus rigidly secures each of the cushion units to the adjacent cushion unit at both the top and the bottom of said units and thereby forms a completed cushion base of the desired final outline of the cushion.

As shown in Fig. 5, the first two left hand cushion units are secured together in substantially the aforesaid manner, while the intermediate or middle cushion unit is secured to the adjacent units by the clips 16, in some instances anchoring coil to coil and in other instances, anchoring the coil 10 of one unit to the open twisted wire 11 of the adjacent unit.

When it is not desired to have each cushion unit separate from every other cushion unit and then subsequently united thereto, two strips of fabric, 30 and 31, of the desired dimensions are suitably secured together at one end, as at 32, and at the opposite end, as at 33, and are secured together intermediate the same, as at 34, thereby forming a plurality of parallel pockets or connected cocoons having open ends. Each cocoon then receives a spring unit of the desired length and then each of the cocoons assumes a substantially rectangular outline in cross section—see Fig. 4.

While in Figs. 1 and 3 the open twisted wires 11 are shown in overlapping relation, it is to be understood that each wire may terminate short of overlapping relation without departing from the invention.

Figure 2:
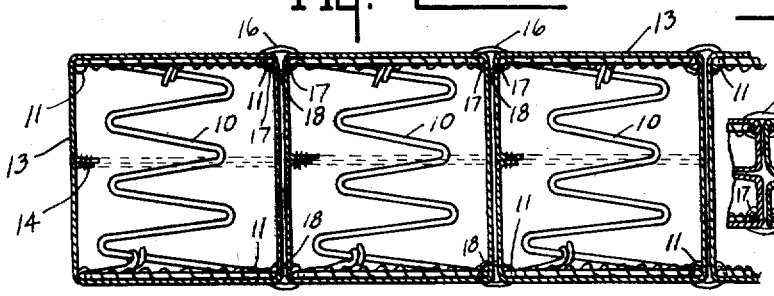
Fig. 2 is an enlarged transverse sectional view through one portion of the cushion unit of the unit base, coils being extended.
Figure 6:
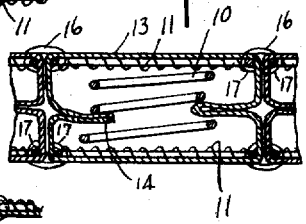
Fig. 6 is a view similar to and of the modification shown in Fig. 2 but with the springs compressed.
Figure 4:
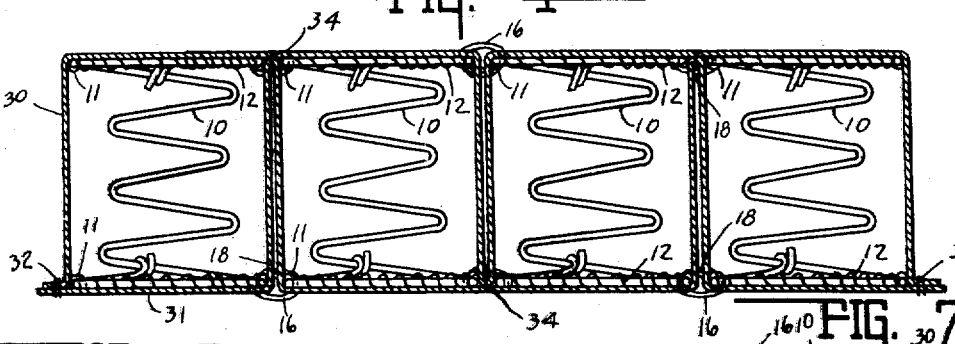
Fig. 4 is a view similar to view 2 and of a modified form of the invention, the coils also being extended.
Figure 7:
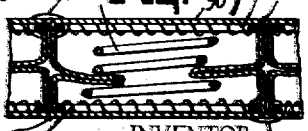
Fig. 7 is a view similar to Fig. 6, the coils being shown compressed and is of the modification shown in Fig. 4.

Comparison of Figs. 6 and 7 with Figs. 2 and 4 respectively, discloses that when the cushion is depressed or loaded, the coil springs collapse or are sufficiently compressed so that the end coils would normally engage each other. However, each side wall of the cocoon being relatively free bows inwardly upon compression and the fabric is interposed in the coils between the upper and lower coils and these are thereby prevented from directly engaging each other with the result, that there is no noise normally incident to such engagement.

The aforesaid noise is not only due to axial contact but is chiefly due to lateral contact because the respective coils rub across each other when the cushion is loaded by a person sitting down thereon, in other words normal use does not secure axial engagement of the coils except in exceptional instances. The aforesaid also illustrates why a separate side wall for each side of each spring unit is employed.

The aforesaid invention permits the furniture manufacturer to purchase spring units from the spring manufacturer, the number of which is relatively limited, and to purchase the fabric from fabric manufacturers, the number of which is relatively limited, and from which they have heretofore purchased the same fabric for other purposes. Then each upholsterer or furniture manufacturer only requires a clip ringer tool and a suitable amount of clip wire which, as indicated, can be readily obtained, since the structure is substantially the same as that used in ringing hogs.

From the foregoing, it will be apparent that, except for the spring units, all of the labor to form the cushion base can be readily performed in the upholstery plant. The resultant construction offers every advantage and none of the disadvantages of the so-called unit cell upholstery construction, which construction is one wherein every coil spring is positioned in a little housing. This unit cell construction is the most expensive of any now known to produce, because each spring coil must be handled separately and the formation of a cushion base requires intricate sewing and positioning of fabric parts together with the main sustaining or border wires, whereas with the present invention, no border wires are required, as the trade commonly interprets this construction.

The invention claimed is:—

1. In a spring construction, the combination of a plurality of elongated spring units, two adjacent units being of dissimilar length, each of the two adjacent spring units comprising a plurality of tandem positioned coil springs arranged in spaced relation, helix means at the top and bottom of each unit and tangential to the opposite sides of the end coils of each spring in the unit for permanently connecting the same together as an independent unit of predetermined length, a plurality of elongated fabric cocoons, each being of a length corresponding to and telescopically receiving and nesting a spring unit of the same length therein, and means connecting the cocoons together to form a complete cushion construction having two parallel sides and a connecting end of curved formation formed by the adjacent end coils of all of the units whereby the necessity for a curved border wire is eliminated.

2. In a spring construction, the combination of a plurality of elongated spring units, two adjacent units being of dissimilar length, each of the two adjacent spring units comprising a plurality of tandem positioned coil springs arranged in spaced relation, helix means at the top and bottom of each unit and tangential to the sides of the end coils of each spring in the unit for permanently connecting the same together as an independent unit of predetermined length, a plurality of elongated fabric cocoons each being of a length corresponding to and telescopically receiving and nesting a spring unit of the same length therein, and means connecting the cocoons together to form a complete cushion construction having two parallel sides and a connecting end of curved formation formed by the adjacent end coils of all of the units whereby the necessity for a curved border wire is eliminated.

ROY S. JONES.